(12) United States Patent
Chen et al.

(10) Patent No.: US 8,632,140 B2
(45) Date of Patent: Jan. 21, 2014

(54) COMPUTER HOUSING STRUCTURE

(75) Inventors: Jie-Dong Chen, Guangzhou (CN);
Zhong Cao, Guangzhou (CN); Gang Cheng, Guangzhou (CN)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 196 days.

(21) Appl. No.: 13/244,098

(22) Filed: Sep. 23, 2011

(65) Prior Publication Data

US 2012/0262042 A1   Oct. 18, 2012

(30) Foreign Application Priority Data

Apr. 15, 2011   (CN) .......................... 2011 2 0110687

(51) Int. Cl.
*A47B 81/00* (2006.01)
(52) U.S. Cl.
USPC ...................................... 312/223.2
(58) Field of Classification Search
USPC ................ 312/223.2; 361/679.58, 679.6
See application file for complete search history.

(56) References Cited

U.S. PATENT DOCUMENTS

| | | | | |
|---|---|---|---|---|
| 5,491,611 A * | 2/1996 | Stewart et al. | ................. | 361/736 |
| 5,967,633 A * | 10/1999 | Jung | ........................... | 312/223.2 |
| 6,354,680 B1 * | 3/2002 | Lin et al. | ..................... | 312/223.2 |
| 6,398,325 B1 * | 6/2002 | Chen et al. | ................. | 312/223.2 |
| 6,542,356 B2 * | 4/2003 | Gan | ......................... | 361/679.58 |
| 6,637,847 B2 * | 10/2003 | Crisp et al. | ................. | 312/223.2 |
| 6,654,251 B2 * | 11/2003 | Yun | ................................. | 361/724 |
| 6,721,183 B1 * | 4/2004 | Chen et al. | .................... | 361/726 |
| 6,775,144 B2 * | 8/2004 | Gan et al. | ....................... | 361/727 |
| 6,924,975 B2 * | 8/2005 | Lai | ............................ | 361/679.02 |
| 7,009,845 B2 * | 3/2006 | Chen et al. | .................... | 361/726 |
| 7,261,383 B2 * | 8/2007 | Fan et al. | .................... | 312/223.2 |
| 7,428,146 B2 * | 9/2008 | Han | ......................... | 361/679.55 |
| 7,428,835 B2 * | 9/2008 | Fan et al. | ........................ | 70/358 |
| 7,874,627 B2 * | 1/2011 | Hsiao et al. | ................. | 312/223.2 |
| 8,120,905 B2 * | 2/2012 | Heistand et al. | ......... | 361/679.58 |
| 8,405,980 B2 * | 3/2013 | Hsu et al. | .................. | 361/679.58 |
| 2002/0167790 A1 * | 11/2002 | Gan | ............................. | 361/683 |
| 2003/0107304 A1 * | 6/2003 | Chen et al. | ................. | 312/223.2 |
| 2005/0023943 A1 * | 2/2005 | Fan et al. | ................... | 312/223.2 |
| 2005/0040740 A1 * | 2/2005 | Yun | ............................. | 312/223.2 |
| 2005/0140254 A1 * | 6/2005 | Chen et al. | ................. | 312/223.2 |
| 2010/0223761 A1 * | 9/2010 | Chen et al. | .......................... | 24/1 |
| 2011/0019361 A1 * | 1/2011 | Heistand et al. | ......... | 361/679.58 |
| 2012/0326579 A1 * | 12/2012 | Tu et al. | ..................... | 312/223.2 |

* cited by examiner

*Primary Examiner* — Hanh V Tran
(74) *Attorney, Agent, or Firm* — Li & Cai Intellectual Property (USA) Office

(57) ABSTRACT

A housing structure includes a main cabinet and a fixing mechanism. The main cabinet has an opening formed thereon and includes a side panel and a front panel. A groove is formed on the edge portion of the front panel adjacent to the side panel. A receiving slot is formed on the front panel and adjacent to the groove. The fixing mechanism includes a latch and an elastic member. The latch may be movably disposed on the side panel. A first hook is formed on the latch. When covering the opening with the side panel, the latch is abutted by the front panel. The restoration of the elastic member interlocks the side panel to the front panel securely to close the housing structure.

11 Claims, 10 Drawing Sheets

COMPUTER HOUSING STRUCTURE

BACKGROUND OF THE INVENTION

1. Field of the Invention

The instant disclosure relates to a computer housing structure; more particularly, to a screw-less type removable side panel structure.

2. Description of Related Art

The use of electronics has become an essential part of the society today. In general, an electronic device has a housing to protect its internal electrical elements. Please refer to FIG. 1, which shows an exploded view of a conventional housing structure 1. The housing structure 1 comprises a main cabinet 11 and a side panel 12. The main cabinet 11 and the side panel 12 can be assembled to form an enclosure. The enclosure is used to house the electrical elements of the electronic device. A bend 14 is formed on one side of the side panel 12. Mounting holes 15 are formed on the bend 14 and the main cabinet 11. Screws 13 for the mounting holes 15 are used to assemble the side panel 12 with the main cabinet 11, thereby enclosing the electrical elements for protection.

However, to disassemble the housing structure 1, significant labor and time must be spent to remove the screws. Furthermore, when trouble-shooting, the screws 13 must be loosened one by one to remove the side panel 12. After the inspection is complete, each screw 13 must be driven into the mounting holes 15 to reassemble the housing structure 1. Such conventional process is troublesome and inefficient for troubleshooting the electronic devices. In addition, a tool must be available to assemble or disassemble the housing structure 1. However, such type of tool is not carried ordinarily by the user of the electronic device. The user has to either scramble for any available tool or request technical support. Otherwise, the troubleshooting process can not be initiated.

Since the conventional fastening method is time and labor consuming, the provision of a screw-less side panel is given great emphasis.

To address the above issues, the inventor strives via industrial experience and academic research to present the instant disclosure, which can effectively improve the limitations described above.

SUMMARY OF THE INVENTION

The instant disclosure provides a housing structure, which comprises a main cabinet and a fixing mechanism. The main cabinet is formed with an opening on one side. The main cabinet also includes a side panel and a front panel. The side panel can be disposed over the opening. The front panel is formed with a groove all the way around the portion thereof adjacent to the side panel. A receiving slot is formed on the front panel adjacent to the groove. The fixing mechanism includes a latch member and an elastic member. The latch member may be slidably disposed on the side panel. A first hook is arranged on the latch member in corresponding to the receiving slot of the front panel. The elastic member is coupled to the latch, with the latch being initially held at a default position. When the opening is covered by the side panel, the first hook is abutted by the groove of the front panel. The abutment pushes the latch away from the front panel to extend the elastic member. After the first hook has slid past the groove, the elastic member is unloaded. As the elastic member restores to its natural length, the latch is returned to its default position accordingly, allowing the first hook to engage with the receiving slot.

Notably, a wedged first abutting surface is formed on the first hook in corresponding to the receiving slot of the front panel.

The front panel further has a flat protruding member. The protruding member is arranged in parallel with the side panel. The latch further has a second hook formed thereon. When the opening is covered by the side panel, the second hook is abutted by the protruding member. The abutment pushes the latch away from the front panel. After the second hook has surpassed the protruding member, the restoring of the elastic member makes the latch to return to its default position. Thus, the second hook is enabled to engage with the protruding member.

Likewise, a sloped second abutting surface is formed on the second hook in corresponding to the protruding member of the front panel.

Also for the housing structure, a bracket is arranged on the side panel. The latch can be movably disposed on the bracket.

A handle is protrudingly disposed on the edge portion of the latch on the same side with the first hook.

A plurality of thru slots is formed across the latch, with a plurality of protrusions formed on the side panel and projected outwardly thru respective slots.

Alternatively, the protrusions may be formed on the bracket and projected outwardly thru respective slots.

In particular, the aforementioned slots are wider toward the front panel versus away from the front panel.

Furthermore, the slots are generally T-shaped.

The elastic member is connected to the latch and the side panel on opposite ends.

The first and second abutting surfaces have generally wedged or curved surfaces.

The instant disclosure has the following advantages. Namely, the side panel can be assembled to or detached from the front panel of the housing structure by the latch of the fixing mechanism. The instant disclosure does not use screws, thus saves time and labor versus the conventional method. The covering of the opening by the side panel and the removal of the side panel itself have been made easier. When the user intends to disassemble the housing structure, the side panel can be easily removed. In addition, no tools are needed to install or remove the side panel. Thereby, the instant disclosure provides greater convenience for the user.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

Figure 1:
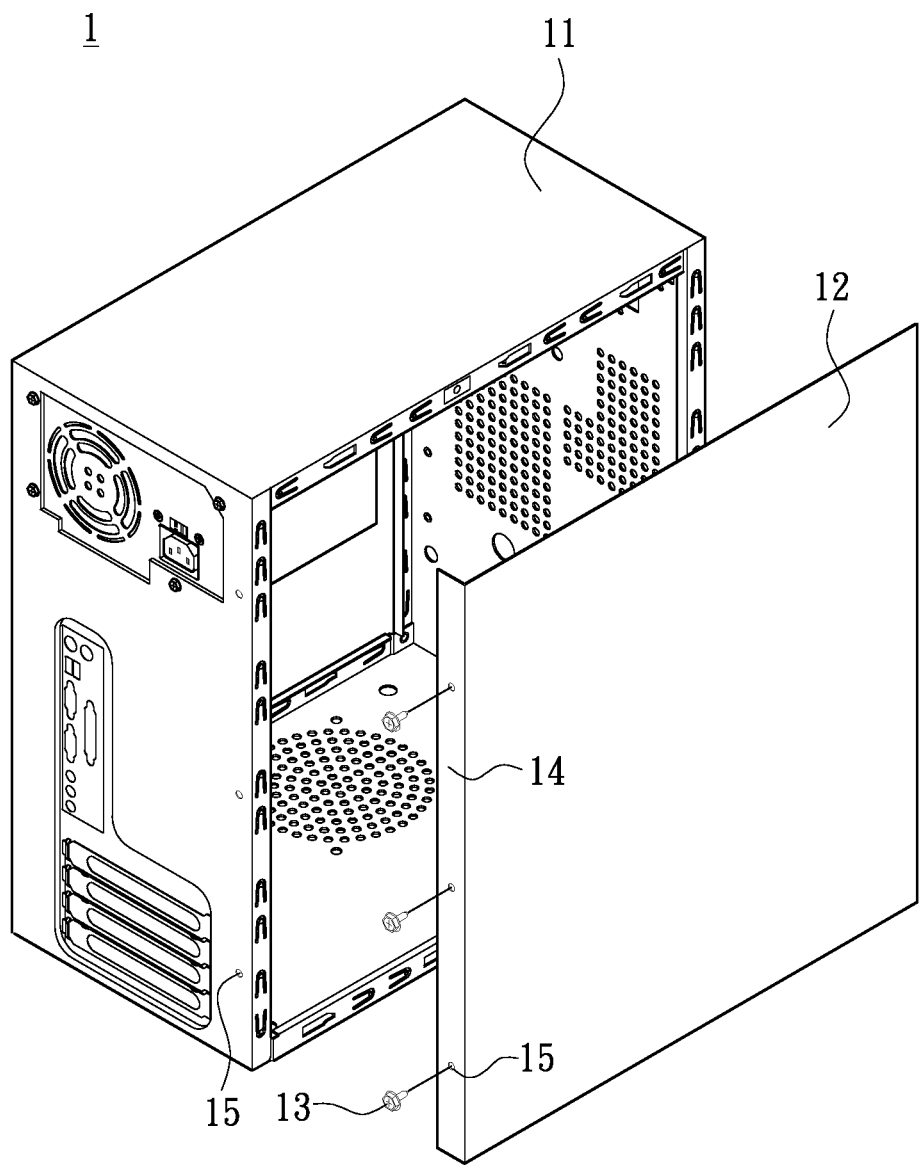
FIG. 1 is an exploded view of a housing structure of an electronic device of the related art.
Figure 2:
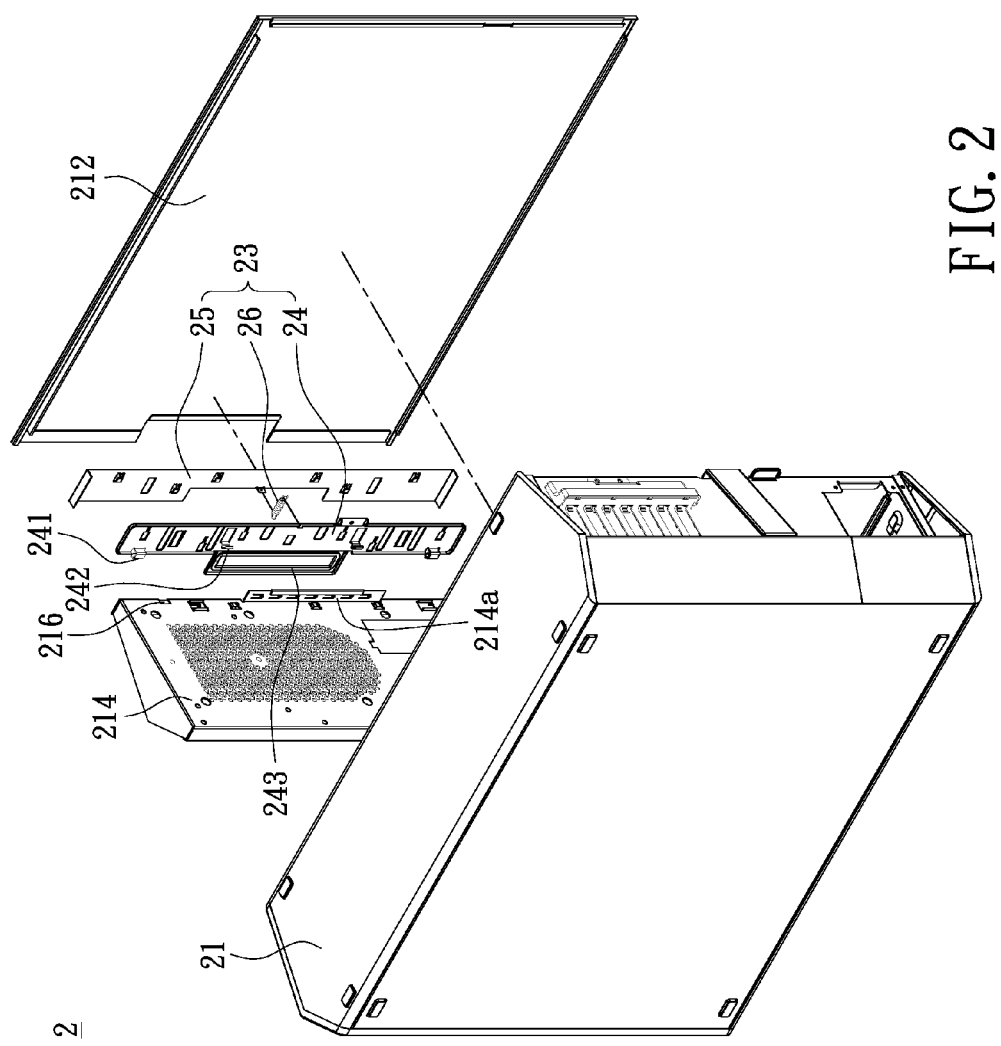
FIG. 2 is an exploded view of a housing structure of the instant disclosure.
Figure 3:
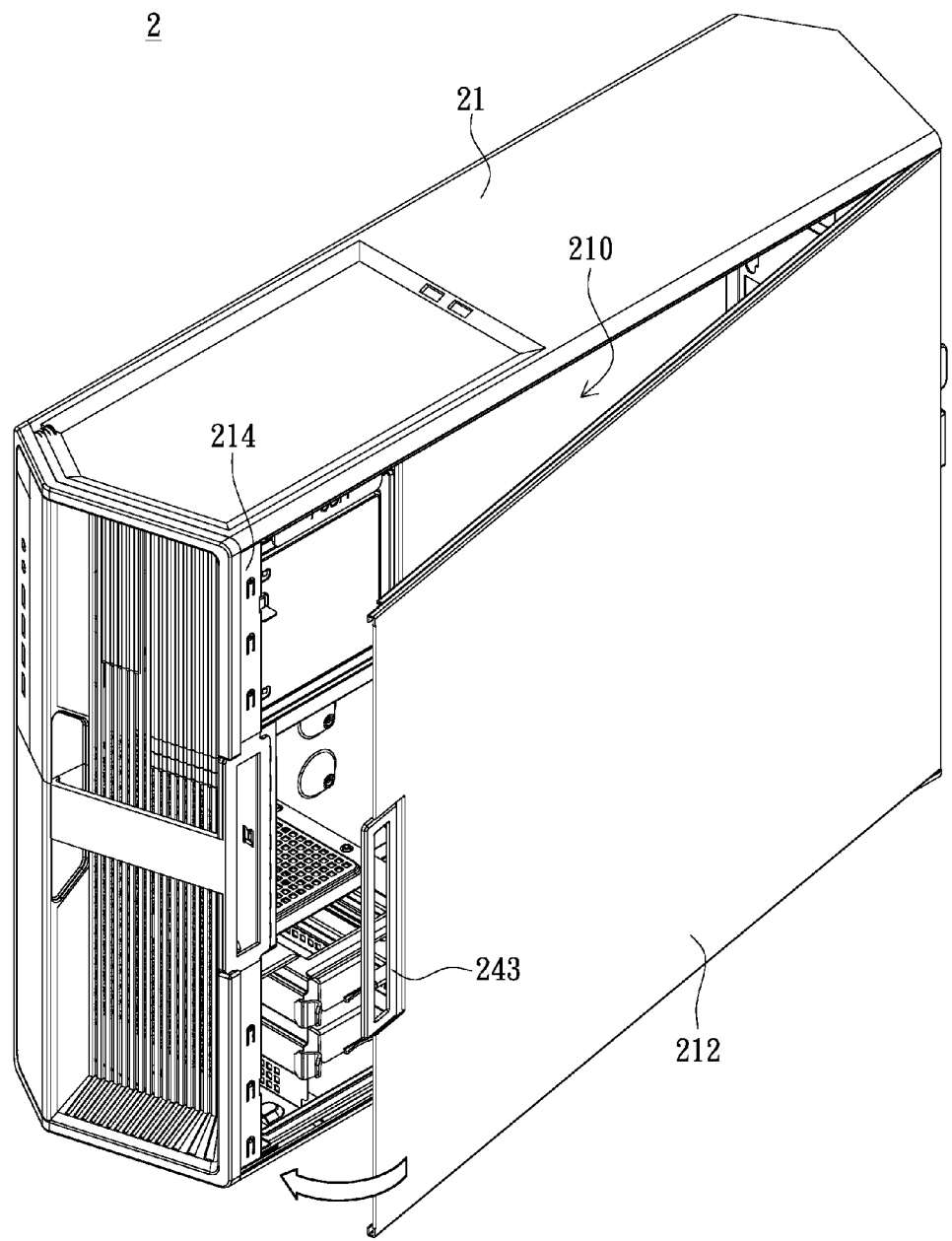
FIG. 3 is a perspective view of installing a side panel of the instant disclosure.

Please refer to FIGS. 2 and 3. The instant disclosure provides a housing structure 2, which includes a main cabinet 21 and a fixing mechanism 23. The main cabinet 21 comprises a side panel 212 and a front panel 214. An opening 210 is defined by the walls of the main cabinet 21. The opening 210 can be covered by the side panel 212 to close the main cabinet 21. Thereby, an enclosure is formed by the main cabinet 21 to house the electrical elements. As illustrated, the front panel 214 and the side panel 212 of the housing structure 2 of the instant disclosure are perpendicularly arranged with respect to each other in an adjacent manner. Other types of arrangements are also permitted.

Figure 4:
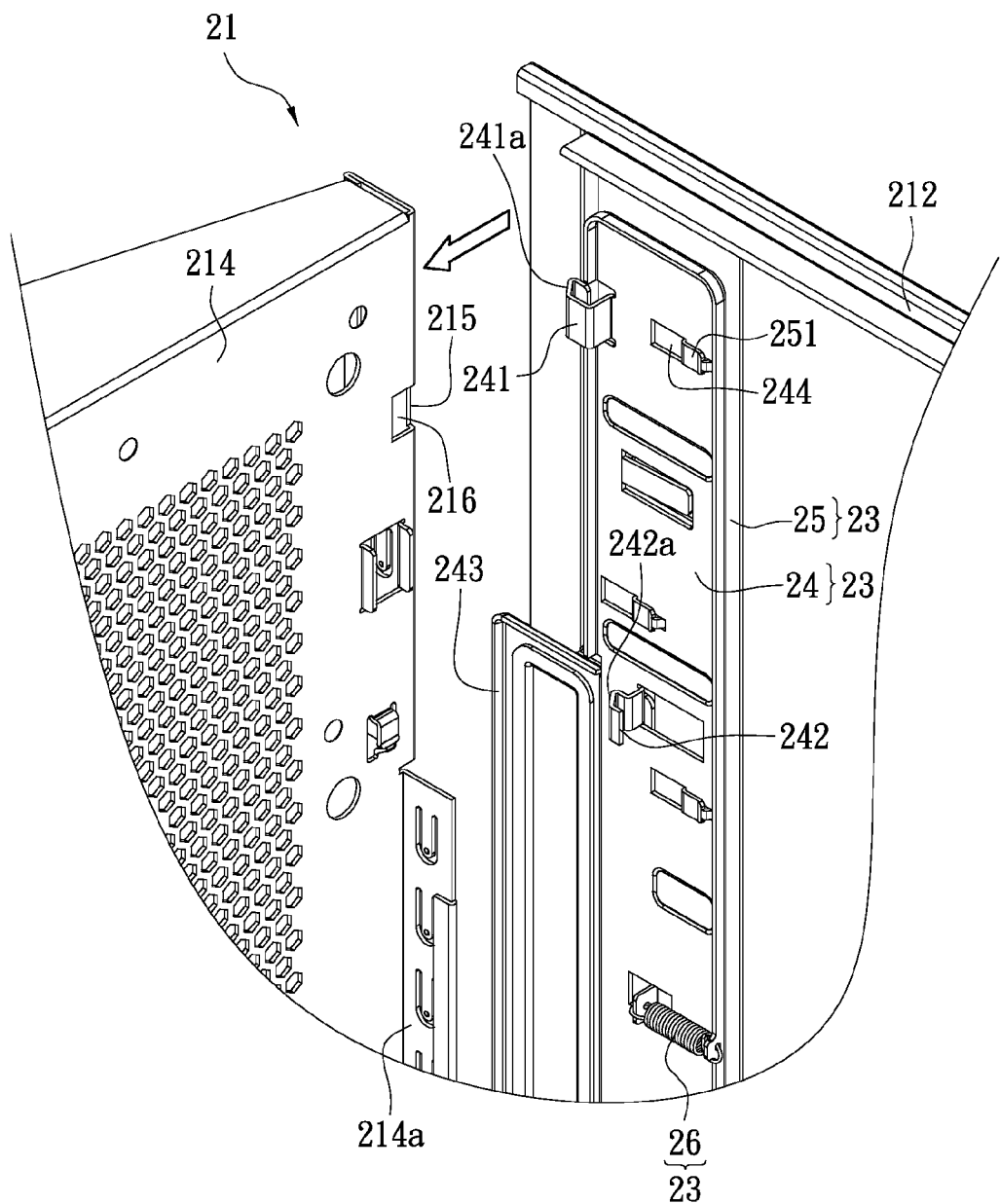
FIG. 4 is a detailed view of FIG. 3.

Please refer to FIG. 4 in conjunction with FIGS. 2 and 3. The fixing mechanism 23 comprises a latch member 24 and an elastic member 26. The latch member 24 can be movably disposed on an edge portion of the side panel 212 and in close proximity to the front panel 214. The latch member 24 has a first hook 241 formed thereon. A wedged first abutting surface 241a is formed on the first hook 241 facing the front panel 214. The elastic member 26 is connected to the latch member 24 and the side panel 212 on opposite ends. When the elastic member 26 is not under any load, the latch member 24 is defined to be at a default position.

Alternatively, a bracket 25 can be disposed on the side panel 212 for holding the fixing mechanism 23. The bracket 25 is disposed on a side portion of the side panel 212. When the opening 210 is covered by the side panel 212, the bracket 25 is near a corresponding side portion of the front panel 214. The bracket 25 can be secured separately onto the side panel 212 or formed integrally therewith. Thereby, for the instant embodiment, the latch member 24 is movably disposed on a side portion of the side panel 212 and in close proximity to a side portion of the front panel 214.

Figure 5:
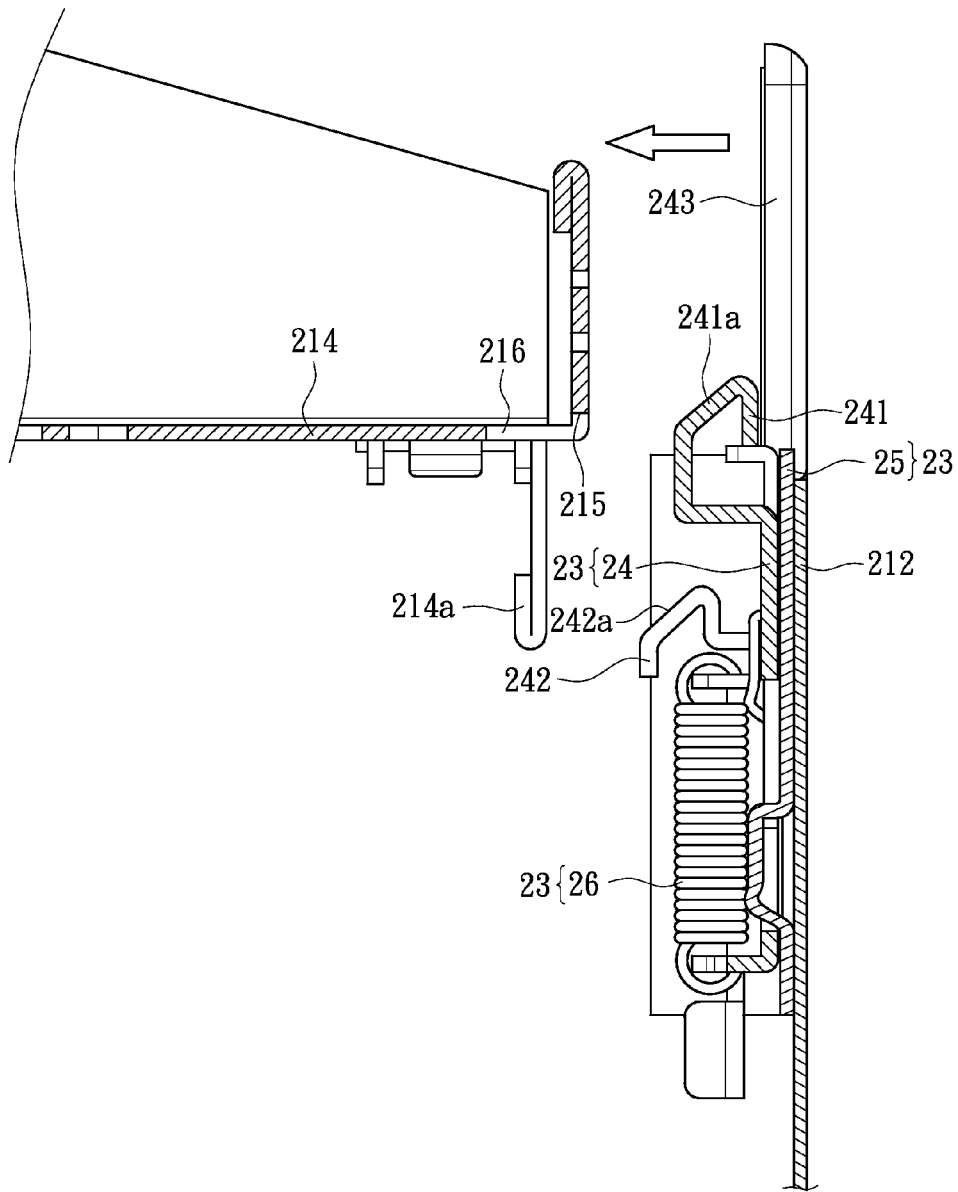
FIG. 5 is a sectional view of the side panel detached from the main cabinet of the instant disclosure.

Please further refer to FIGS. 3 to 5. In sequence, FIG. 3 shows the covering of the opening 210 by the side panel 212, FIG. 4 shows a perspective view of the side panel 212 to be assembled with the front panel 214, and FIG. 5 is a sectional view of FIG. 4. The front panel 214 is formed with at least one groove 215 all the way around the portion thereof adjacent to the side panel 212. A receiving slot 216 is further formed on the groove 215 for receiving the first hook 241. A flat protruding member 214a is arranged on the edge portion of the front panel 214 on the same side with the groove 215 and the receiving slot 216. The protruding member 214a is in parallel with the side panel 212. In addition, the latch member 24 may further include a second hook 242. A wedged second abutting surface 242a is formed on the second hook 242 in correspondence to the protruding member 214a. To close the main cabinet 21, the user only needs to apply a pressing force to the side panel 212 toward the opening 210. The side panel 212 would abut to the front panel 214 to close the main cabinet 21.

Figure 6:
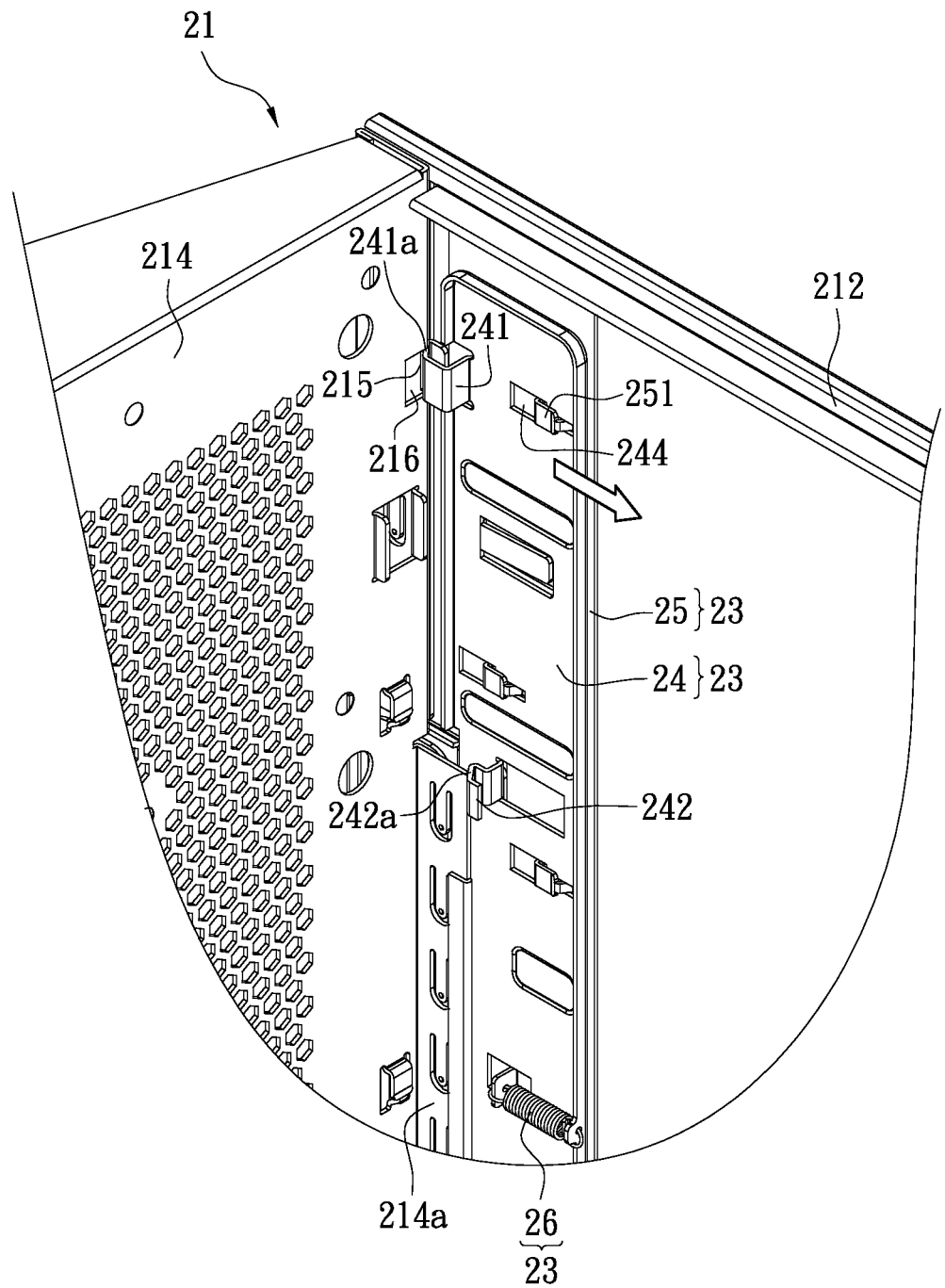
FIG. 6 is a perspective view of assembling the side panel to the main cabinet of the instant disclosure.
Figure 7:
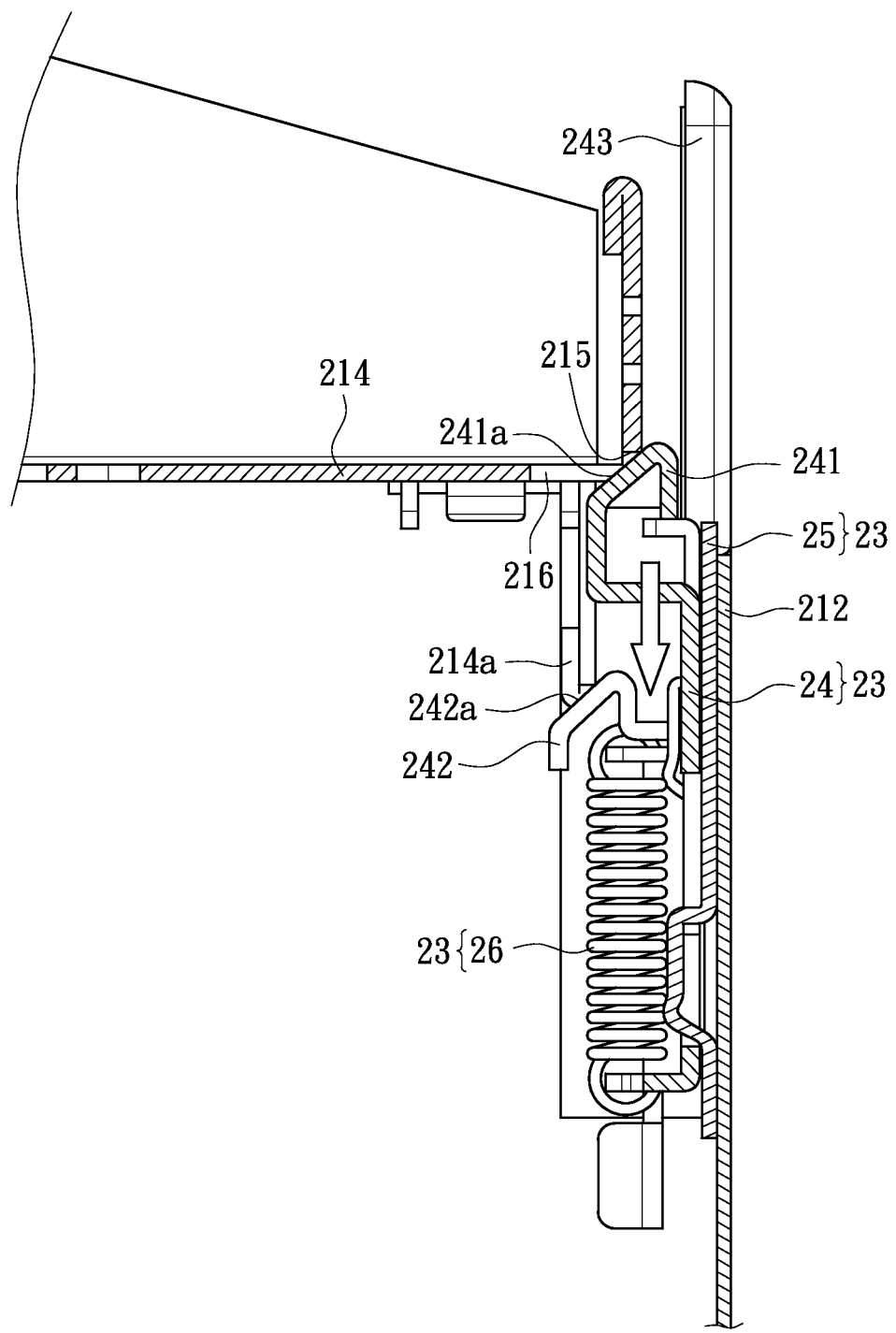
FIG. 7 is a sectional view of FIG. 6.

Please refer to FIGS. 6 and 7, which show a perspective and sectional view of the side panel 212 interlocking with the front panel 214, respectively. As shown in the figures, when the side panel 212 is pressed toward the opening 210, the latch member 24 becomes abutted by the front panel 214. In particular, the first abutting surface 241a of the first hook 241 of the latch member 24 is abutted by the groove 215. The abutment forces the latch member 24 to move away from the front panel 214. Meanwhile, the second abutting surface 242a of the second hook 242 is abutted by the protruding member 214a. Likewise, the abutment forces the latch to move away from the front panel 214. At such moment, the elastic member 26 is being extended in storing up energy. Notably, the first and second abutting surfaces 241a and 242a are preferably wedged or curved. Those types of surfaces allow the latch member 24 to be pushed smoothly by the counter force exerted from the front panel 214 during abutment.

Figure 8:
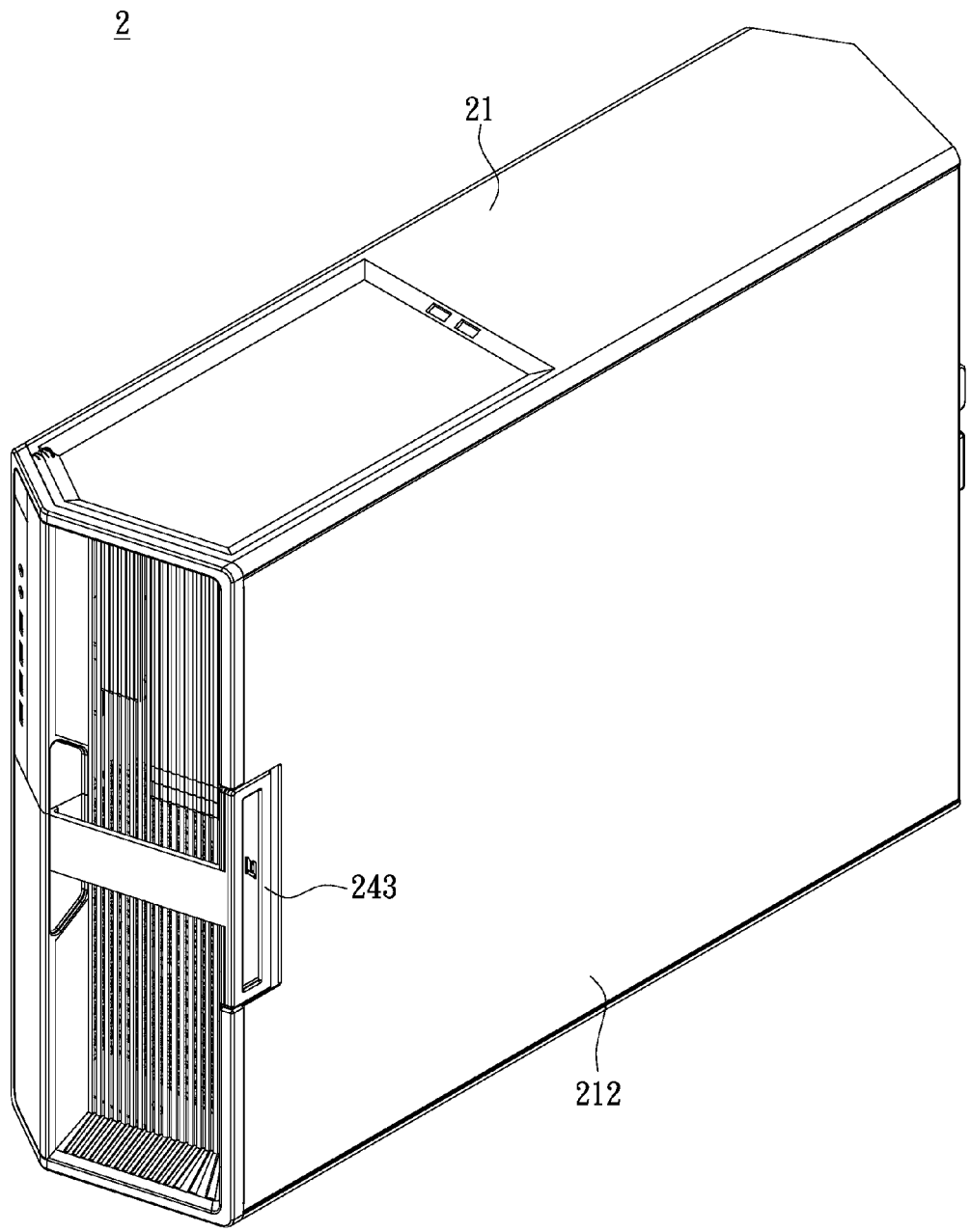
FIG. 8 is a perspective view of the side panel being assembled to the main cabinet of the instant disclosure.
Figure 9:
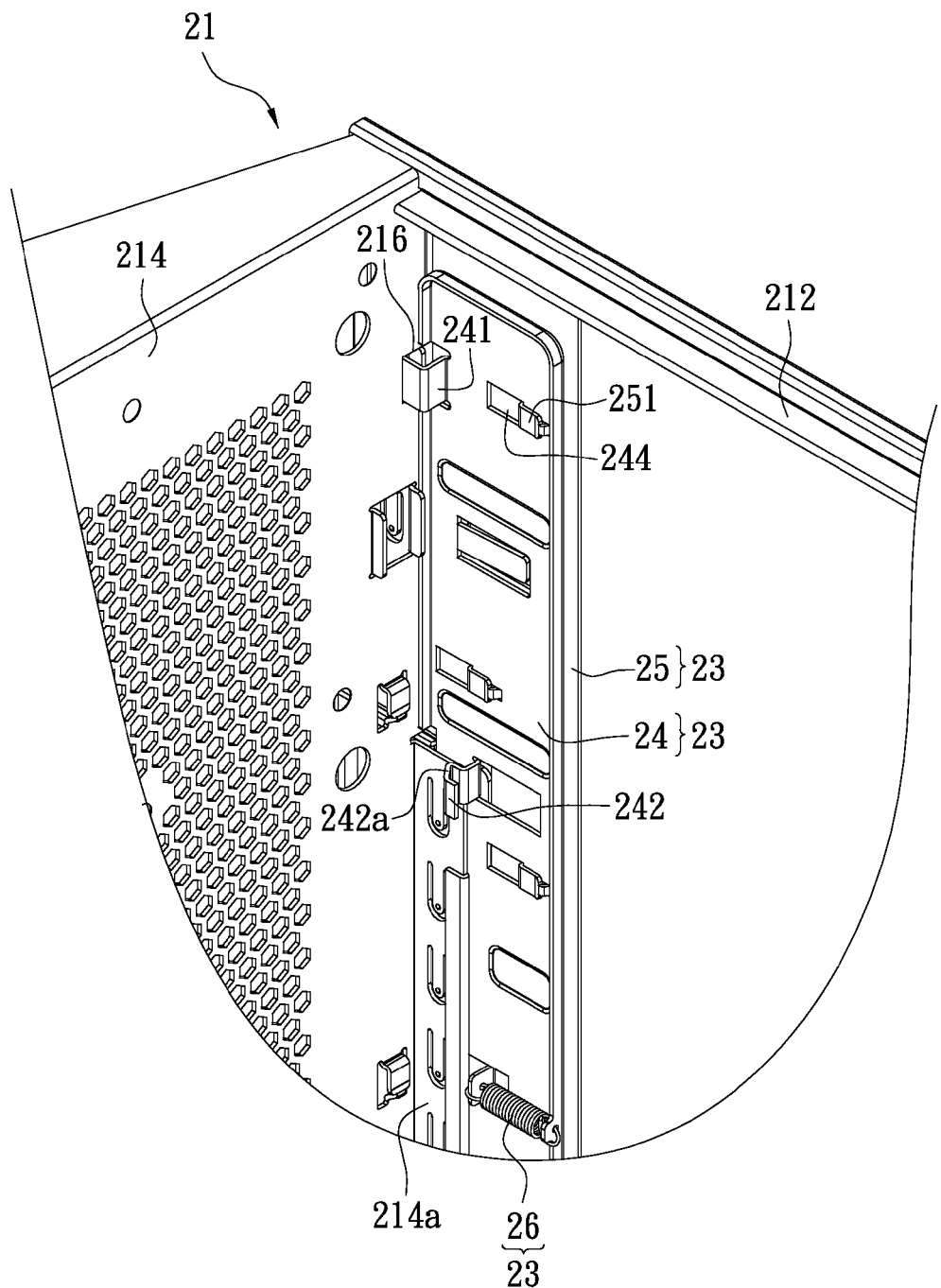
FIG. 9 is an internal view of the housing structure with the side panel assembled to the front panel of the instant disclosure.
Figure 10:
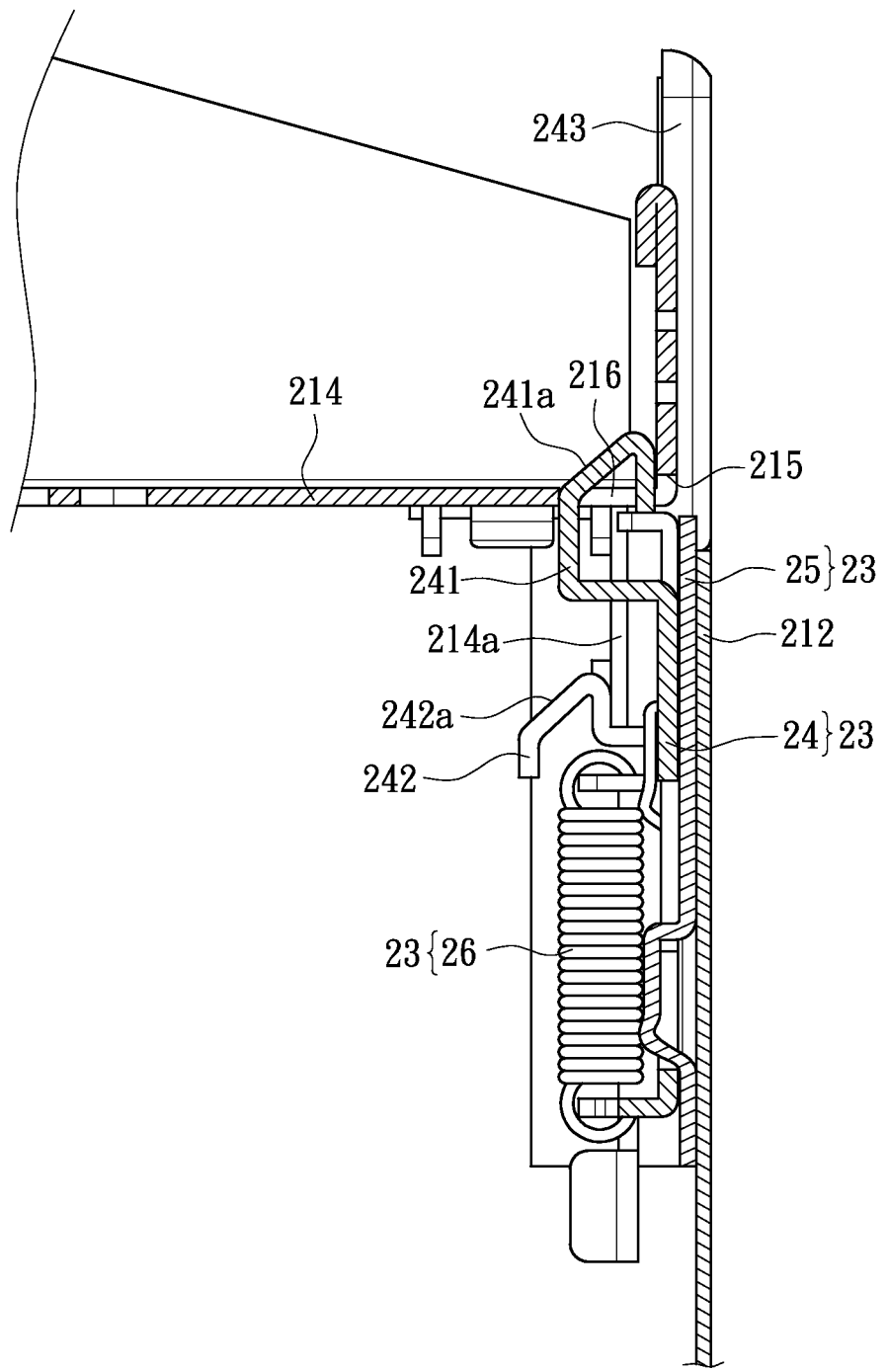
FIG. 10 is a sectional view of FIG. 9.

Please refer to FIGS. 8 to 10, which illustrate a perspective view, a detailed view, and a sectional view showing the side panel 212 interlocked with the front panel 214, respectively. After the first hook 241 has moved beyond the groove 215 and the second hook 242 has moved past the protruding member 214a, the first and second hooks 241 and 242 are no longer abutted. Such state means the latch member 24 is no longer under the counter force exerted by the front panel 214. Therefore, the elastic member 26 returns to its original length and releases the stored energy. The stored energy brings the latch member 24 toward the front panel 214 and returns the latch member 24 to its original position prior to abutment. By the mechanical interlocking engagement between the first hook 241 and the receiving slot 216 in the groove 215, along with the presence of the second hook 242 and the protruding member 214a, the side panel 212 is secured to the front panel 214 in preventing accidental detachment.

Please refer back to FIGS. 2 and 4. A handle 243 is further disposed on the latch member 24. The handle 243 is disposed on the edge portion of the latch member 24 on the same side with the first hook 241. The handle 243 extends beyond the front panel 214 and is preferably formed with the latch member 24 in one piece. Thus, the user can apply an external force to move the latch away from the front panel 214 via the handle 243. Furthermore, the latch member 24 is slidably disposed on the bracket 25. Namely, a plurality of thru slots 244 are formed on the latch member 24. Meanwhile, a plurality of L-shaped protrusions 251 is formed on the bracket 25 and projects through respective slots 244. The size of the slots 244 defines the distance of which the latch member 24 may slide relative to the bracket 25 (FIGS. 4 and 6). Notably, the bracket 25 can be integrally formed with the side panel 212. The actual structural configuration may be determined by the manufacturer. Specifically, for the instant embodiment, the slots 244 are wider toward the front panel 214 versus away from the front panel 214. Preferably, the slots 244 are T-shaped.

To disassemble the side panel 212 from the housing structure 2, the user only needs to pull the handle 243 lightly to move the latch member 24 away from the front panel 214. As the latch member 24 moves away from the front panel 214, the first hook 241 is disengaged from the receiving slot 216 and the second hook 242 is disengaged from the protruding member 214a. At the same time, a slight lifting force can be applied vertically about the side panel 212. By removing the side panel 212, the housing structure 2 can be uncovered to expose the opening 210 of the main cabinet 21.

Based on needs, the number, the shape, and the engaging means of the first hook 241 and the second hook 242 can be varied accordingly. The receiving slot 216 can be formed as a thru slot. One possible alternative may be that the latch member 24 of the housing structure 2 has a plurality of first hooks 241 and second hooks 242. Correspondingly, a plurality of receiving slots 216 is formed on the front panel 214 to accommodate the first hooks 241. Preferably, the latch member 24 has two first hooks 241 and two second hooks 242. The two first hooks 241 are received by the respective receiving slots 216. The two second hooks 242 are engaged to the protruding member 214a.

By the mechanical interlocking engagement of the first hook and the second hook of the fixing mechanism to the front panel, the side panel can be securely fixed to the front panel. To detach the side panel, the user only needs to apply a slight force to operate the handle. The screw-less technique of the instant disclosure saves time and effort in comparing to the conventional means. The installation and removal of the side panel has been greatly simplified through the instant disclosure. Furthermore, no tool is needed to work with the side panel. Thus, the installation and removal procedures of the side panel are more convenient.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A computer housing structure, comprising:
    a main cabinet having a front panel and an openable side panel, the side panel cooperatively defining an enclosure when being shut toward the front panel in a closed configuration and providing access to the interior of the main cabinet when in an open configuration, wherein the front panel is formed with a receiving slot on an edge portion thereof proximate to the side panel and has a protruding member parallel to the side panel; and
    a fixing mechanism disposed on one edge of the side panel in correspondence to the front panel, the fixing mechanism including:
        a latch member, wherein the latch member has:
            a first hook having a wedged first abutting surface in correspondence to the edge portion of the front panel;
            a second hook having a wedged second abutting surface in correspondence to the protruding member; and
        an elastic member coupled to the latch member, the latch member being movably disposed on the side panel and movable between a default position and an unlatched position, wherein the latch member is kept at a default position when no load is applied to the elastic member;
    wherein upon closing of the side panel, the edge portion of the front panel presses against the wedged first abutting surface of the first hook while the protruding member presses against the wedged second abutting surface of the second hook, the first and second hooks are biased toward the unlatched position, and then the first and second hooks return to the default position by the elastic member,
    such that the first hook enters the receiving slot and the second hook engages the protruding member to retain the side panel in the closed configuration.

2. The housing structure of claim 1, wherein a bracket is disposed on the side panel to receive the latch movably.

3. The housing structure of claim 1, wherein the latch further includes a handle disposed on the edge portion of the latch on the same side with the first hook, and wherein the handle extends beyond the front panel.

4. The housing structure of claim 1, wherein a plurality of slots are formed across the latch, and wherein a plurality of protrusions are formed on the side panel and projected thru the slots.

5. The housing structure of claim 2, wherein a plurality of slots are formed across the latch, and wherein a plurality of protrusions are formed on the bracket and projected thru the slots.

6. The housing structure of claim 4, wherein the slot is dimensionally wider toward the front panel versus away thereof.

7. The housing structure of claim 6, wherein the slot is substantially T-shaped.

8. The housing structure of claim 7, wherein the elastic member is connected to the latch and the side panel on opposite ends.

9. The housing structure of claim 5, wherein the slot is dimensionally wider toward the front panel versus away thereof.

10. The housing structure of claim 9, wherein the slot is substantially T-shaped.

11. The housing structure of claim 10, wherein the elastic member is connected to the latch and the side panel on opposite ends.

* * * * *